United States Patent
Jang

(10) Patent No.: US 11,375,281 B1
(45) Date of Patent: Jun. 28, 2022

(54) METHOD AND APPARATUS FOR PROVIDING SKIPPING OF ADVERTISING CONTENT BASED ON VIDEO RECOGNITION WHEN WATCHING ADVERTISING-BASED FREE OTT SERVICE THROUGH TV

(71) Applicant: INNOPIA TECHNOLOGIES, INC., Gyeonggi-do (KR)

(72) Inventor: Dong-yoon Jang, Gyeonggi-do (KR)

(73) Assignee: INNOPIA TECHNOLOGIES, INC., Gyeonggi-Do (KR)

( * ) Notice: Subject to any disclaimer, the term of this patent is extended or adjusted under 35 U.S.C. 154(b) by 0 days.

(21) Appl. No.: 17/507,731

(22) Filed: Oct. 21, 2021

(30) Foreign Application Priority Data

May 26, 2021 (KR) .................... 10-2021-0067674

(51) Int. Cl.
*H04N 21/472* (2011.01)
*H04N 21/44* (2011.01)
*H04N 21/81* (2011.01)

(52) U.S. Cl.
CPC . *H04N 21/47217* (2013.01); *H04N 21/44008* (2013.01); *H04N 21/812* (2013.01)

(58) Field of Classification Search
CPC ....... H04N 21/47217; H04N 21/44008; H04N 21/812; H04N 21/23418
USPC .......................................................... 725/32
See application file for complete search history.

(56) References Cited

U.S. PATENT DOCUMENTS

| | | | | |
|---|---|---|---|---|
| 7,302,160 | B1 * | 11/2007 | Wells | G11B 27/105 386/250 |
| 10,887,664 | B2 * | 1/2021 | Gupta | H04N 21/6547 |
| 2014/0105567 | A1 * | 4/2014 | Casagrande | H04N 21/4888 386/230 |
| 2018/0160195 | A1 * | 6/2018 | Redmond | H04N 21/4622 |
| 2018/0357666 | A1 * | 12/2018 | Lewis | G06Q 30/0261 |
| 2021/0377620 | A1 * | 12/2021 | Ramkumar | H04N 21/458 |

FOREIGN PATENT DOCUMENTS

| | | |
|---|---|---|
| KR | 10-2010-0018162 | 2/2010 |
| KR | 10-2019-0028160 | 3/2019 |
| KR | 10-2020-0056904 | 5/2020 |
| KR | 10-2020-0132798 | 11/2020 |

* cited by examiner

*Primary Examiner* — Cynthia M Fogg
(74) *Attorney, Agent, or Firm* — Christensen O'Connor Johnson Kindness PLLC

(57) ABSTRACT

Provided is an apparatus for providing skipping of advertising content based on video recognition, the apparatus including a controller configured configured to control video recognition for providing skipping of advertising content of an advertising-based OTT receiving platform; a video recognition model executor configured to synchronize a target image with a video frame analyzer; the video frame analyzer configured to transmit information about the target image to a reception advertising controller; the reception advertising controller configured to generate a plurality of control signals according to a type of the target image and to transmit the plurality of control signals to a media playback unit or a media reception processing unit; the media playback unit configured to control a pop-up banner advertisement or media stream playback according to the control signal; and the media reception processing unit configured to control reception of the data according to the control signal.

8 Claims, 4 Drawing Sheets

METHOD AND APPARATUS FOR PROVIDING SKIPPING OF ADVERTISING CONTENT BASED ON VIDEO RECOGNITION WHEN WATCHING ADVERTISING-BASED FREE OTT SERVICE THROUGH TV

CROSS-REFERENCE TO RELATED APPLICATION

This application claims the priority benefit of Korean Patent Application No. 10-2021-0067674, filed on May 26, 2021, in the Korean Intellectual Property Office, the disclosure of which is incorporated herein by reference.

BACKGROUND

1. Field of the Invention

Example embodiments of the following description relate to a method and apparatus for providing skipping of advertising content based on video recognition when viewing an advertising-based free Over-the-Top (OTT) service through a television (TV).

2. Description of the Related Art

An Over-the-Top (OTT) service refers to a service that provides a variety of media contents, such as broadcast programs and movies, through the open Internet. That is, the OTT service refers to a television (TV) service that may be viewed through the general Internet rather than terrestrial or cable. Such an OTT market has grown rapidly from the mid to late 2000s due to the spread of the high-speed Internet and portable terminals based on such Internet and is currently threatening a TV service through terrestrial or cable.

Accordingly, there are an increasing number of various platforms and companies that professionally provide such OTT services. Also, broadcasting companies that provide TV services through the existing terrestrial or cable maintain TV services through terrestrial or cable and, also, provide the same content in real time through an OTT platform.

As the related art, a system for providing a real-time broadcasting service by retransmitting ground radio wave is disclosed in Korean Patent Laid-Open Publication No. 10-2019-0028160.

As described above, the system for providing a real-time broadcasting service by retransmitting ground radio wave according to the related art includes an advertisement in a broadcast that is provided in real time.

In the related art, such as, for example, Korean Patent Laid-Open Publication No. 10-2020-0132798, published on Nov. 25, 2020, a personal computer (PC) and a smartphone have provided a function of blocking an advertisement through a separate application or a browser extension function, for example, a web app, however, are providing an incomplete method, such as an inability of blocking again an advertisement due to version upgrade of a corresponding OTT service.

Also, there may be a legal issue in that a corresponding OTT service providing entity or advertisers provide a forcible blocking function without a consumer selection.

In particular, when viewing an advertising-based free OTT service through a TV, which is currently activate, simple skip using a touch as in a smartphone is not allowed and the inconvenience of pressing an "OK" button on a remote controller is added.

SUMMARY

Example embodiments provide a method and apparatus that may solve the user inconvenience of having to directly press a button with a remote controller by detecting and automatically executing a skip function or a pop-up advertising banner disable button (i.e., an x mark) activated after a minimum playback time of an advertisement played back in a beginning or in a middle of playing back an Over-the-Top (OTT) service through a television (TV), in order to solve the inconvenience of having to skip through the remote controller when viewing an advertising-based free OTT service through the TV.

According to an aspect of at least one example embodiment, there is provided an apparatus for providing skipping of advertising content based on video recognition when viewing an advertising-based free OTT service through a TV, the apparatus including a controller configured to, when advertising content is played back during media stream playback of an advertising-based OTT receiving platform, control video recognition for providing skipping of advertising content; a video recognition model executor configured to synchronize a target image for skipping of advertising content that is recognized during playback of the advertising content with a video frame analyzer in response to an instruction of the controller; the video frame analyzer configured to synchronize with the video recognition model executor and to extract and identify the target image for skipping of advertising content from the advertising content being played back, and to transmit information about the extracted and identified target image to a reception advertising controller; the reception advertising controller configured to generate a plurality of control signals according to a type of the target image extracted and identified by the video frame analyzer and to transmit the plurality of control signals to a media playback unit or a media reception processing unit; the media playback unit configured to play back a media stream including OTT and advertising content and to control media stream playback according to a control signal received from the reception advertising controller; and the media reception processing unit configured to receive data for media stream playback from an external server that provides the media stream including the OTT and the advertising content and to control reception of the data according to a control signal received from the reception advertising controller.

The advertising content may include a video advertisement and a pop-up banner advertisement. The video recognition model executor may be configured to execute a video recognition model code in which a target image for skipping of advertising content is pre-stored and learned and the video frame analyzer may be configured to perform video recognition for each frame during playback of advertising content, and when the pre-stored target image that is activated after minimum playback time of advertising content is recognized, synchronize information about the corresponding target image with the reception advertising controller.

The reception advertising controller may be configured to, when the target image extracted and identified by the video frame analyzer is the skip button for terminating playback of the video advertisement, generate a control signal for controlling reception of a video advertisement being received from the external server to execute the skip button and transmit the generated control signal to the media reception processing unit, and when the target image extracted and identified by the video frame analyzer is the quit button for terminating the pop-up banner advertisement, generate a control signal for controlling the pop-up banner advertisement to execute the quit button and transmit the generated control signal to the media playback unit.

The controller may be configured to inquire a user through a user interface to enable setting or release of performing video recognition for providing skipping of advertising content during the media stream playback of the advertising-based OTT receiving platform and set or release the performing of the video recognition according to a result of inquiring.

According to another aspect of at least one example embodiment, there is provided a method of providing skipping of advertising content based on video recognition when viewing an advertising-based free OTT service through a TV, the method including, when advertising content is played back during media stream playback of an advertising-based OTT receiving platform, controlling video recognition for providing skipping of advertising content through a controller; executing, by a video recognition model executor, a video recognition model code in which a target image for skipping of advertising content is pre-stored and learned and synchronizing the target image for skipping of advertising content that is recognized during playback of the advertising content with a video frame analyzer in response to an instruction of the controller; extracting, by the video frame analyzer, and identifying the target image for skipping of advertising content from the advertising content being played back through synchronization with the video recognition model executor, and transmitting information about the extracted and identified target image to a reception advertising controller; generating, by the reception advertising controller, a plurality of control signals according to a type of the target image extracted and identified by the video frame analyzer and transmitting the plurality of control signals to a media playback unit or a media reception processing unit; playing back, by the media playback unit, a media stream including OTT and advertising content and controlling a pop-up banner advertisement or media stream playback according to a control signal received from the reception advertising controller; and receiving, by the media reception processing unit, data for media stream playback from an external server that provides the media stream including the OTT and the advertising content and controlling reception of the data according to a control signal received from the reception advertising controller.

According to some example embodiments, the user inconvenience of having to directly press a button with a remote controller may be solved by detecting and automatically executing a skip function or a pop-up advertising banner disable button (i.e., an x mark) activated after a minimum playback time of an advertisement played back in a beginning or in a middle of playing back an OTT service through a TV, in order to solve the inconvenience of having to skip through a remote controller when viewing an advertising-based free OTT service through the TV. In addition, it is possible to avoid legal issues that may be raised by service providers or advertisers according to a use of an advertising blocking function that is unconditionally executed when viewing advertising-based free OTT content through a TV, and to eliminate the inconvenience such as reinstallation according to invalidation of the advertising blocking function by upgrade of an OTT service app version.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
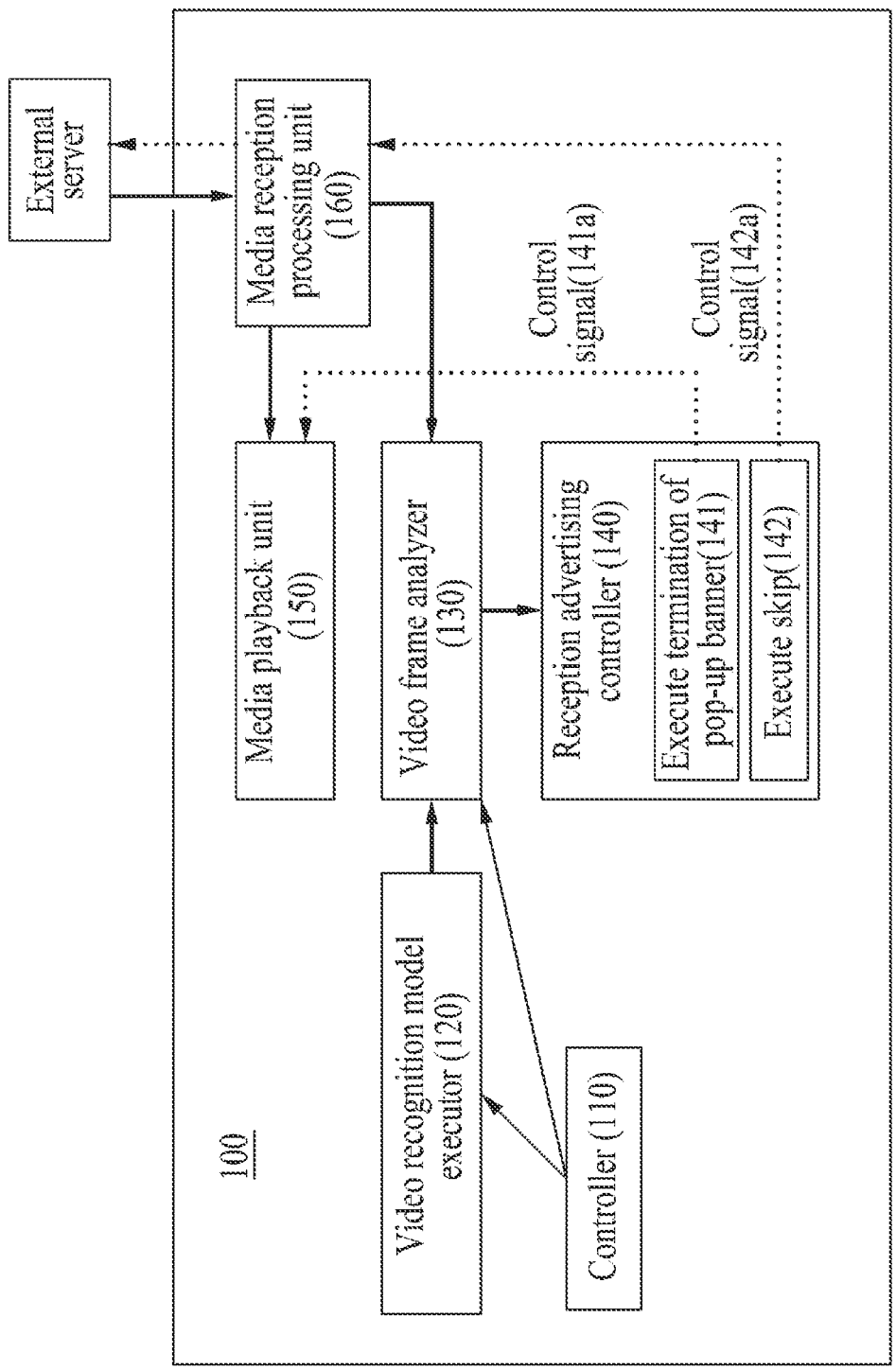
FIG. 1 illustrates a configuration of an apparatus for providing skipping of advertising content based on video recognition when viewing an advertising-based free Over-the-Top (OTT) service according to an example embodiment.

Hereinafter, some example embodiments will be described in detail with reference to the accompanying drawings. The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

The terminology used herein is for describing various example embodiments only, and is not to be used to limit the disclosure. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Terms, such as first, second, and the like, may be used herein to describe components. Each of these terminologies is not used to define an essence, order or sequence of a corresponding component but used merely to distinguish the corresponding component from other components). For example, a first component may be referred to as a second component, and similarly the second component may also be referred to as the first component, without departing from the scope of the disclosure.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

Hereinafter, example embodiments will be described with reference to the accompanying drawings.

FIG. 1 illustrates a configuration of an apparatus for providing skipping of advertising content based on video recognition when viewing an advertising-based free Over-the-Top (OTT) service (hereinafter, an advertising content skipping providing apparatus) according to an example embodiment.

An advertising content skipping providing apparatus 100 proposed herein is to solve the user inconvenience of having to directly press a button with a remote controller by detecting and automatically executing a skip function or a pop-up advertising banner disable button (i.e., an x mark) activated after a minimum playback time of an advertisement played back in a beginning or in a middle of playing back an OTT service through a television (TV), in order to solve the inconvenience of having to skip through the remote controller when viewing an advertising-based free OTT service through the TV.

Referring to FIG. 1, the proposed advertising content skipping providing apparatus 100 includes a controller 110, a video recognition model executor 120, a video frame analyzer 130, a reception advertising controller 140, a media playback unit 150, and a media reception processing unit 160.

The controller 110 according to an example embodiment controls video recognition for providing skipping of advertising content when advertising content is played back during media stream playback of an advertising-based OTT receiving platform. For example, the controller 110 may automatically recognize a skip function activated after a minimum playback time of an advertisement that is switched and played back in a beginning or in a middle of viewing an advertising-based free OTT video through a TV and may control the skip function to be executed. The controller 110 is in charge of controlling the above video recognition function.

The video recognition model executor 120 according to an example embodiment executes a video recognition model code in which a target image for skipping of advertising content is pre-stored and learned, and synchronizes the target image for skipping of advertising content that is recognized during playback of the advertising content with the video frame analyzer 130.

The advertising content may include a video advertisement and a pop-up banner advertisement. The target image for skipping of advertising content according to an example embodiment may include a skip button for terminating playback of the video advertisement and a quit button for terminating the pop-up banner advertisement.

Here, the advertising content and the target image for skipping of advertising content are provided as examples only. Therefore, various advertising contents and target images for skipping of advertising content may be further applied.

The video recognition model executor 120 pre-stores a corresponding target image for skipping of advertising content according to a type of the advertising content. For example, the corresponding target image for skipping of advertising content according to the type of the advertising content may include a skip button for terminating playback of a video advertisement and a quit button for terminating a pop-up banner advertisement.

The video recognition model executor 120 executes the video recognition model code in which the target image for skipping of advertising content is pre-stored and learned and synchronizes the corresponding target image with the video frame analyzer 130 in response to the instruction of the controller 110.

The video frame analyzer 130 according to an example embodiment synchronizes with the video recognition model executor 120 and extracts and identifies the target image for skipping of advertising content from the advertising content being played back, and transmits information about the extracted and identified target image to the reception advertising controller 140.

The video frame analyzer 130 extracts and identifies information about the corresponding target image for skipping of advertising content according to the type of the target image pre-stored in the video recognition model executor 120 and transmits the extracted and identified information to the reception advertising controller 140.

For example, in the case of a video advertisement, the video frame analyzer 130 may extract and identify a skip button for terminating playback of the corresponding video advertisement and may transmit related information to the reception advertising controller 140. Also, in the case of a pop-up banner advertisement, the video frame analyzer 130 may extract and identify a quit button for terminating the corresponding pop-up banner advertisement and may transmit related information to the reception advertising controller 140.

The reception advertising controller 140 according to an example embodiment generates a plurality of control signals based on the type of target image extracted and identified by the video frame analyzer 130 and transmits the plurality of control signals to the media playback unit 150 or the media reception processing unit 160.

When the target image extracted and identified by the video frame analyzer 130 is the skip button for terminating playback of the video advertisement, the reception advertising controller 140 may generate a control signal 142a for controlling reception of a video advertisement being received from an external server to execute the skip button (142). The reception advertising controller 140 transmits the generated control signal 142a to the media reception processing unit 160. Since the video advertisement is transmitted to the OTT receiving platform through the media reception processing unit 160, the reception advertising controller 140 transmits the control signal 142a for skipping the video advertisement to the media reception processing unit 160.

When the target image extracted and identified by the video frame analyzer 130 is the quit button for terminating the pop-up banner advertisement, the reception advertising controller 140 may generate a control signal 141a for controlling the pop-up banner advertisement to execute the quit button (141). The reception advertising controller 140 transmits the generated control signal 141a to the media playback unit 150. Since the pop-up banner advertisement is directly controllable by the media playback unit 150, the reception advertising controller 140 transmits the control signal 141a for terminating the pop-up banner advertisement to the media playback unit 150.

The media playback unit 150 according to an example embodiment plays back a media stream including OTT and advertising content and controls the pop-up banner advertisement or the media stream playback according to a control signal received from the reception advertising controller 140.

When receiving, from the reception advertising controller 140, the control signal 141*a* for controlling the pop-up banner advertisement to execute the quit button of the pop-up banner advertisement, the media playback unit 150 may terminate the pop-up banner advertisement according to the received control signal 141*a*. Subsequently, the media playback unit 150 may terminate the pop-up banner advertisement and may resume an OTT service being viewed.

The media reception processing unit 160 according to an example embodiment receives data for media stream playback from the external server that provides the media stream including the OTT and the advertising content and controls reception of the data according to a control signal received from the reception advertising controller 140.

When receiving, from the reception advertising controller 140, the control signal 142*a* for controlling reception of the video advertisement received from the external server to execute the skip button of the video advertisement, the media reception processing unit 160 may transmit the received control signal 142*a* to the external server and may terminate reception of the video advertisement according to the received control signal 142*a*. Subsequently, the media playback unit 150 may terminate the video advertisement and may resume an OTT service being viewed.

The controller 110 according to an example embodiment may inquire a user through a user interface to enable setting or release of performing video recognition for providing skipping of advertising content during the media stream playback of the advertising-based OTT receiving platform and may set or release the performing of the video recognition according to a result of inquiring.

That is, the controller 110 may inquire the user through the user interface of the advertising-based OTT receiving platform to which the advertising content skipping providing apparatus 100 is applied that suggests the user of whether to autonomously execute skip of a video advertisement or termination of a pop-up banner advertisement each time and perform corresponding setting or releasing accordingly.

The user interface for setting or releasing performing of video recognition according to an example embodiment may set a setting value on a setting screen output on a TV display or through an application installed on a smart terminal. An actual function providing scheme for setting or releasing performing of the video recognition may follow the policy of OTT, advertisers, or broadcasting/communication providers operating products to which the proposed advertising content skipping providing apparatus 100 is applied.

Figure 2:
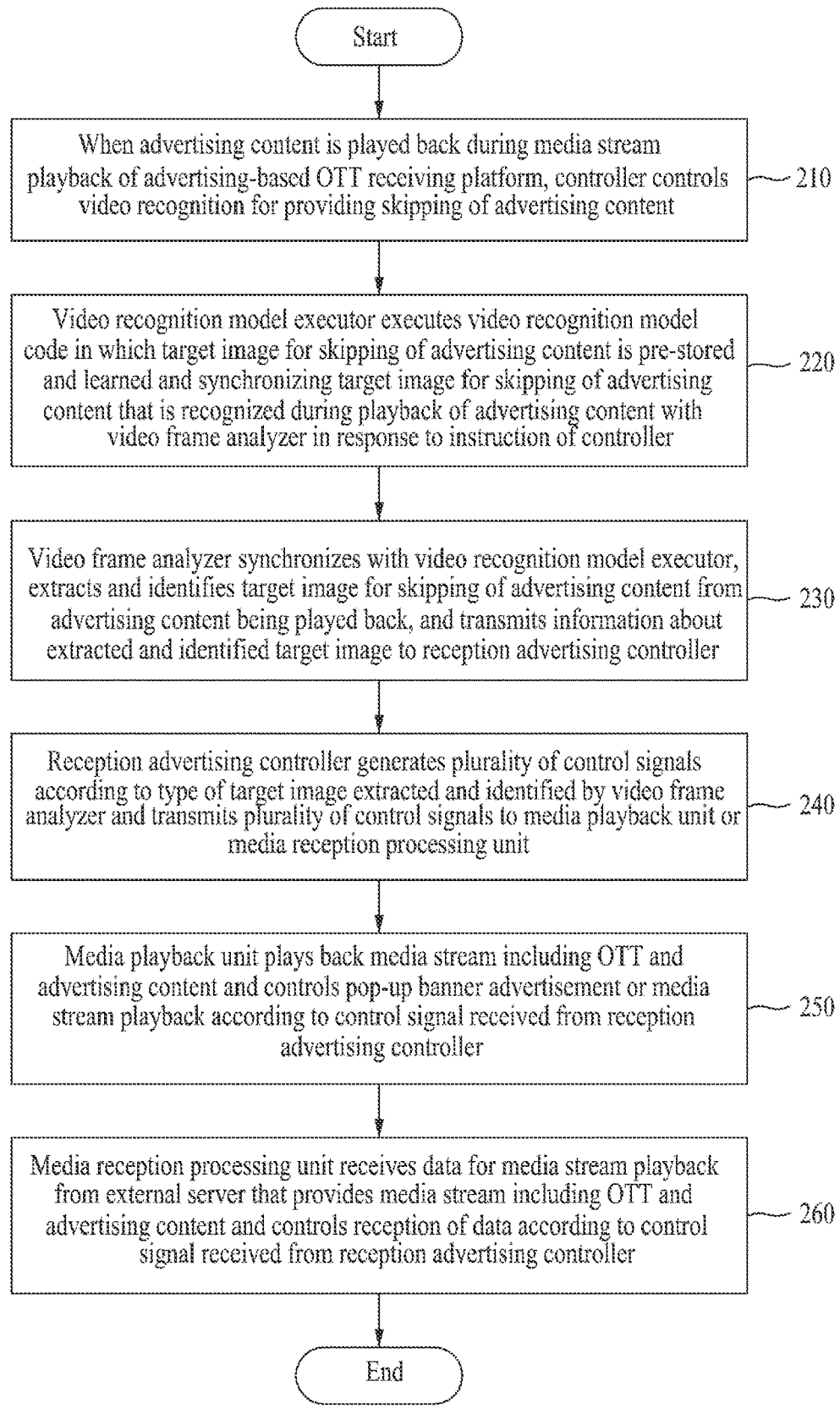
FIG. 2 is a flowchart illustrating a method of providing skipping of advertising content based on video recognition when viewing an advertising-based free OTT service according to an example embodiment.

FIG. 2 is a flowchart illustrating a method of providing skipping of advertising content based on video recognition when viewing advertising-based free OTT (hereinafter, an advertising content skipping providing method) according to an example embodiment.

An advertising content skipping providing method proposed herein is to solve the user inconvenience of having to directly press a button with a remote controller by detecting and automatically executing a skip function or a pop-up advertising banner disable button (i.e., an x mark) activated after a minimum playback time of an advertisement played back in a beginning or in a middle of playing back an OTT service through a TV, in order to solve the inconvenience of having to skip through the remote controller when viewing an advertising-based free OTT service through the TV.

Referring to FIG. 2, the advertising content skipping providing method includes operation 210 of, when advertising content is played back during media stream playback of an advertising-based OTT receiving platform, controlling video recognition for providing skipping of advertising content through a controller; operation 220 of executing, by a video recognition model executor, a video recognition model code in which a target image for skipping of advertising content is pre-stored and learned and synchronizing the target image for skipping of advertising content that is recognized during playback of the advertising content with a video frame analyzer in response to an instruction of the controller; operation 230 of extracting, by the video frame analyzer, and identifying the target image for skipping of advertising content from the advertising content being played back through synchronization with the video recognition model executor, and transmitting information about the extracted and identified target image to a reception advertising controller; operation 240 of generating, by the reception advertising controller, a plurality of control signals according to a type of the target image extracted and identified by the video frame analyzer and transmitting the plurality of control signals to a media playback unit or a media reception processing unit; operation 250 of playing back, by the media playback unit, a media stream including OTT and advertising content and controlling a pop-up banner advertisement or media stream playback according to a control signal received from the reception advertising controller; and operation 260 of receiving, by the media reception processing unit, data for media stream playback from an external server that provides the media stream including the OTT and the advertising content and controlling reception of the data according to a control signal received from the reception advertising controller.

In operation 210, when advertising content is played back during media stream playback of the advertising-based OTT receiving platform, the controller controls video recognition for providing skipping of advertising content. For example, the controller according to an example embodiment may automatically recognize a skip function that is activated after a minimum playback time of an advertisement that is switched and played back in a beginning or in a middle of viewing an advertising-based free OTT video through a TV and may control the skip function to be executed. The controller is in charge of controlling the above video recognition function.

The controller according to an example embodiment may inquire a user with a user interface to enable setting or release of performing video recognition for providing skipping of advertising content during media stream playback of the advertising-based OTT receiving platform based on an advertisement and may set or release the performing of the video recognition according to a result of inquiring.

That is, the controller may inquire the user through the user interface of the advertising-based OTT receiving platform to which the advertising content skipping providing apparatus 100 is applied that suggests the user of whether to autonomously execute skip of the video advertisement or termination of the pop-up banner advertisement each time and perform corresponding setting or releasing accordingly.

The user interface for setting or releasing performing of video recognition according to an example embodiment may set a setting value on a setting screen output on a TV display or through an application installed on a smart terminal. An actual function providing scheme for setting or releasing performing of the video recognition may follow the policy of OTT, advertisers, or broadcasting/communication providers operating products to which the advertising content skipping providing apparatus is applied.

In operation 220, the video recognition model executor executes the video recognition model code in which the target image for skipping of advertising content is pre-stored and learned and synchronizes the target image for skipping of advertising content that is recognized during playback of the advertising content with the video frame analyzer in response to an instruction of the controller.

The advertising content according to an example embodiment may include a video advertisement and a pop-up banner advertisement. The target image for skipping of advertising content according to an example embodiment may include a skip button for terminating playback of the video advertisement and a quit button for terminating the pop-up banner advertisement.

Here, the advertising content and the target image for skipping of advertising content are provided as examples only. Therefore, various advertising contents and target images for skipping of advertising content may be further applied.

The video recognition model executor according to an example embodiment pre-stores a corresponding target image for skipping of advertising content according to a type of the advertising content. For example, the corresponding target image for skipping of advertising content according to the type of the advertising content may include a skip button for terminating playback of a video advertisement and a quit button for terminating a pop-up banner advertisement.

The video recognition model executor executes the video recognition model code in which the target image for skipping of advertising content is pre-stored and learned and synchronizes the corresponding target image with the video frame analyzer in response to the instruction of the controller.

In operation 230, the video frame analyzer synchronizes with the video recognition model executor, extracts and identifies the target image for skipping of advertising content from the advertising content being played back, and transmits information about the extracted and identified target image to the reception advertising controller.

The video frame analyzer according to an example embodiment extracts and identifies information about the corresponding target image for skipping of advertising content according to the type of the target image pre-stored in the video recognition model executor and transmits the extracted and identified information to the reception advertising controller.

For example, in the case of a video advertisement, the video frame analyzer may extract and identify a skip button for terminating playback of the corresponding video advertisement and may transmit information about the extracted and identified target image to the reception advertising controller. Also, in the case of a pop-up banner advertisement, the video frame analyzer may extract and identify a quit button for terminating the corresponding pop-up banner advertisement and may transmit information about the extracted and identified target image to the reception advertising controller.

In operation 240, the reception advertising controller generates the plurality of control signals according to the type of target image extracted and identified by the video frame analyzer 130 and transmits the plurality of control signals to the media playback unit or the media reception processing unit.

When the target image extracted and identified by the video frame analyzer according to an example embodiment is the skip button for terminating playback of the video advertisement, the reception advertising controller may generate a control signal for controlling reception of a video advertisement being received from an external server to execute the skip button. The reception advertising controller transmits the generated control signal to the media reception processing unit. Since the video advertisement is transmitted to the OTT receiving platform through the media reception processing unit, the reception advertising controller transmits the control signal for skipping the video advertisement to the media reception processing unit.

When the target image extracted and identified by the video frame analyzer according to an example embodiment is the quit button for terminating the pop-up banner advertisement, the reception advertising controller may generate a control signal for controlling the pop-up banner advertisement to execute the quit button. The reception advertising controller transmits the generated control signal to the media playback unit. Since the pop-up banner advertisement is directly controllable by the media playback unit, the reception advertising controller transmits the control signal for terminating the pop-up banner advertisement to the media playback unit.

In operation 250, the media playback unit plays back a media stream including OTT and advertising content and controls the pop-up banner advertisement or the media stream playback according to a control signal received from the reception advertising controller.

When receiving, from the reception advertising controller, the control signal for controlling the pop-up banner advertisement to execute the quit button of the pop-up banner advertisement, the media playback unit may terminate the pop-up banner advertisement according to the received control signal. Subsequently, the media playback unit may terminate the pop-up banner advertisement and may resume an OTT service being viewed.

In operation 260, the media reception processing unit receives data for media stream playback from the external server that provides the media stream including the OTT and the advertising content and controls reception of the data according to a control signal received from the reception advertising controller.

When receiving, from the reception advertising controller, the control signal for controlling reception of the video advertisement received from the external server to execute the skip button of the video advertisement, the media reception processing unit may transmit the received control signal to the external server and may terminate reception of the video advertisement according to the received control signal. Subsequently, the media playback unit 150 may terminate the video advertisement and may resume an OTT service being viewed.

Figure 3:
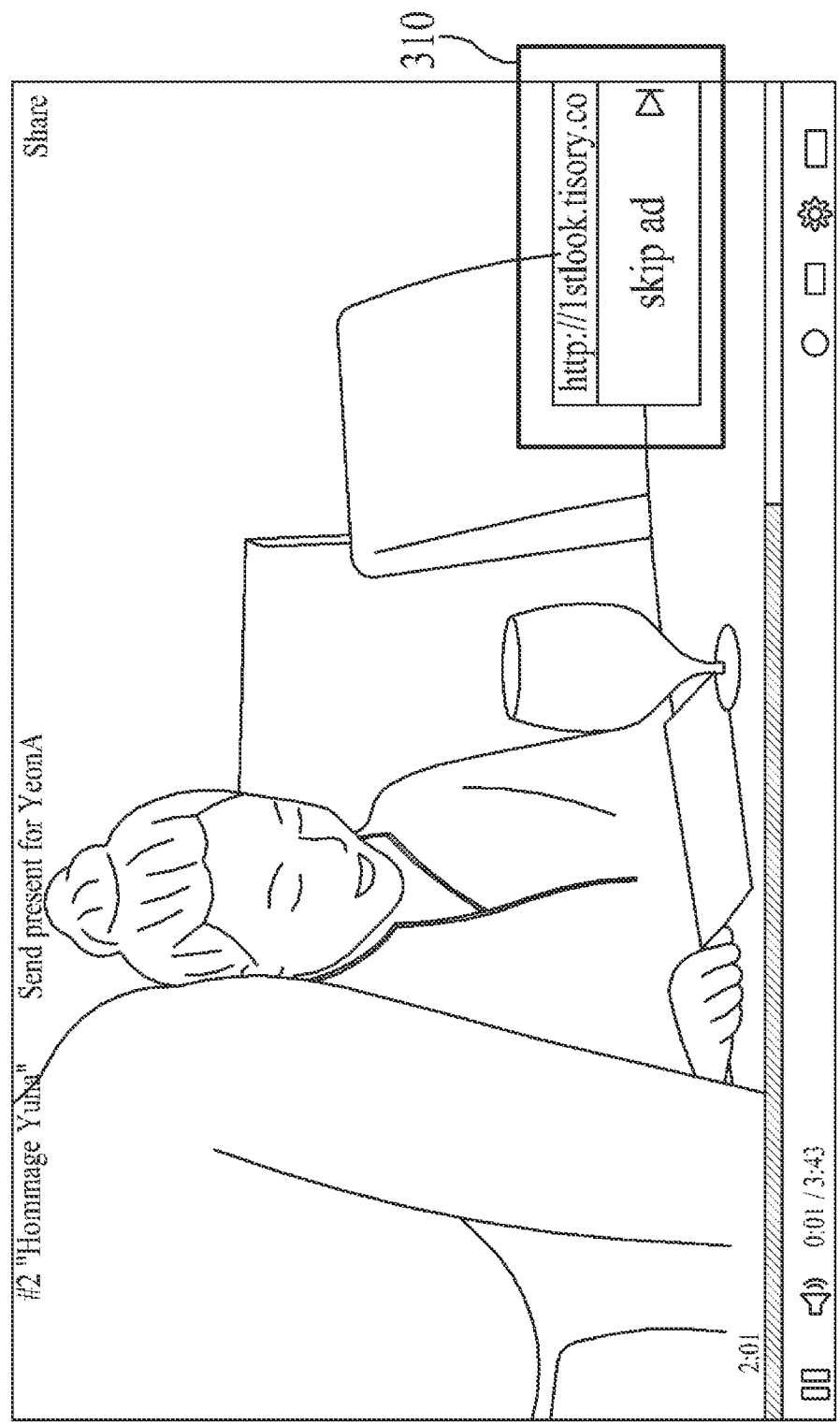
FIG. 3 illustrates an example of describing a process of skipping a video advertisement according to an example embodiment.

FIG. 3 illustrates an example of describing a process of skipping a video advertisement according to an example embodiment.

FIG. 3 illustrates an example of describing a process of skipping a video advertisement when the video advertisement is played back during media stream playback of an advertising-based OTT receiving platform according to an example embodiment.

When the video advertisement is played back, the controller according to an example embodiment controls video recognition for providing skipping of the video advertisement. The video recognition model executor executes a video recognition model code in which a target image 310 for skipping of advertising content is pre-stored and learned and synchronizes the target image 310 for skipping of the video advertisement being recognized during playback of the video advertisement with the video frame analyzer. For example, the target image 310 for skipping of the video advertisement may refer to a skip button for terminating playback of the video advertisement as shown in FIG. 3.

The video recognition model executor pre-stores the target image 310 for skipping of the video advertisement. For example, the video recognition model executor may pre-store the skip button image for terminating playback of the video advertisement.

The video recognition model executor executes the video recognition model code according to an instruction of the controller and synchronizes the corresponding target image 310 with the video frame analyzer.

The video frame analyzer synchronizes with the video recognition model executor and extracts and identifies a target image for skipping of the video advertisement from the video advertisement being played back, and transmits information about the extracted and identified target image to the reception advertising controller.

The reception advertising controller may generate a control signal for controlling reception of a video advertisement received from the external server to execute the skip button. The reception advertising controller transmits the generated control signal to the media reception processing unit. Since the video advertisement is transmitted to the OTT receiving platform through the media reception processing unit, the reception advertising controller transmits the control signal for skipping the video advertisement to the media reception processing unit.

The media reception processing unit receives data for media stream playback from the external server that provides the media stream including the OTT and the advertising content, and controls reception of the data according to a control signal received from the reception advertising controller.

When receiving, from the reception advertising controller, the control signal for controlling reception of the video advertisement received from the external server to execute the skip button of the video advertisement, the media reception processing unit may transmit the received control signal to the external server and may terminate reception of the video advertisement according to the received control signal. Subsequently, the media playback unit may terminate the video advertisement and resume an OTT service being viewed.

Figure 4:
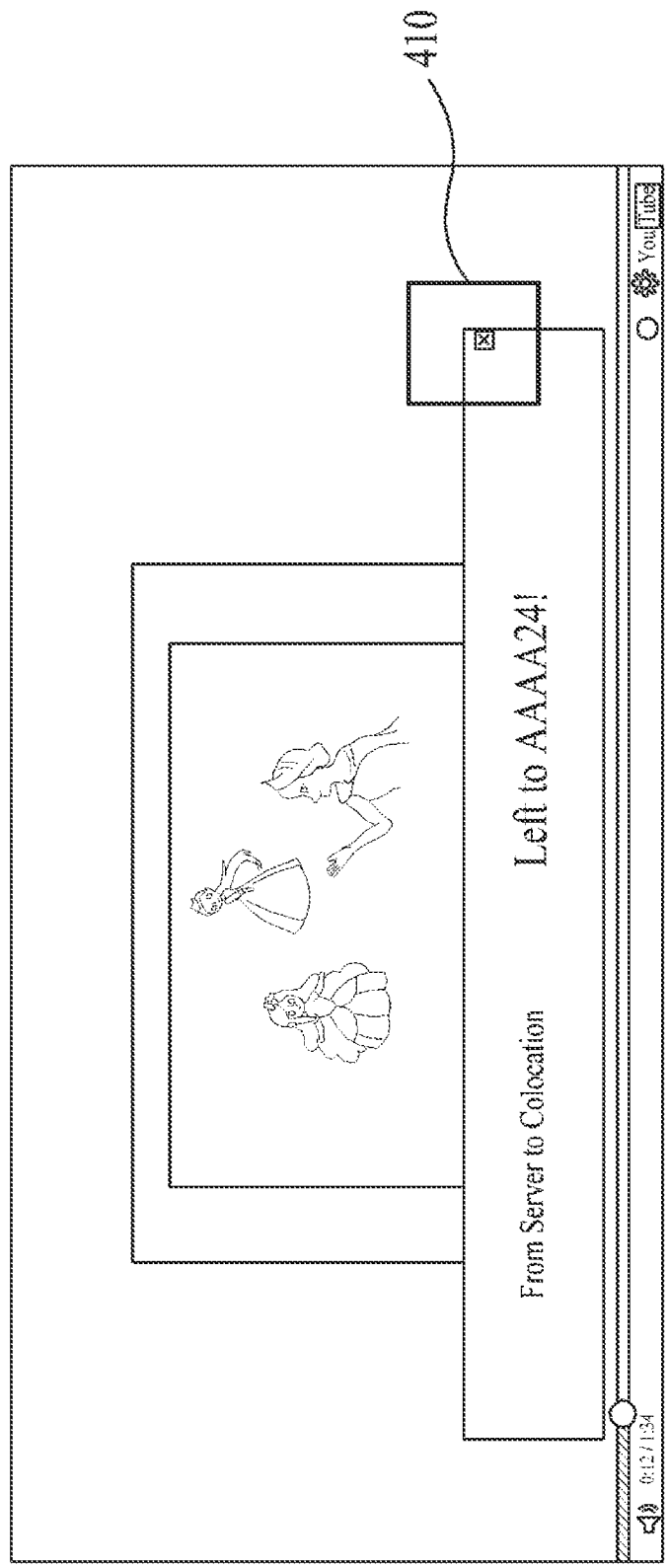
FIG. 4 illustrates an example of a process of skipping a pop-up banner advertisement according to an example embodiment.

FIG. 4 illustrates an example of describing a process of skipping a pop-up banner advertisement according to an example embodiment.

FIG. 4 illustrates an example of describing a process of terminating a pop-up banner advertisement when the pop-up banner advertisement is generated during media stream playback of an advertising-based OTT receiving platform.

When the pop-up banner advertisement is generated, the controller according to an example embodiment controls video recognition for providing termination processing of the pop-up banner advertisement. The video recognition model executor synchronizes a target image 410 for termination processing of pop-up banner advertisement being recognized during generation of the pop-up banner advertisement with the video frame analyzer. For example, the target image 410 for termination processing of the pop-up banner advertisement may refer to a quit button (that is, an x mark) for terminating generation of the pop-up banner advertisement as shown in FIG. 4.

The video recognition model executor pre-stores the target image 410 for termination processing of the pop-up banner advertisement. For example, the video recognition model executor may pre-store the quit button for terminating generation of the pop-up banner advertisement.

The video recognition model executor executes a video recognition model code according to an instruction of the controller and synchronizes the target image 410 with the video frame analyzer.

The video frame analyzer synchronizes with the video recognition model executor and extracts and identifies a target image for termination processing of the pop-up banner advertisement from the pop-up banner advertisement being generated and transmits information about the extracted and identified target image to the reception advertising controller.

The reception advertising controller may generate a control signal for controlling the pop-up banner advertisement to execute the quit button. The reception advertising controller transmits the generated control signal to the media playback unit. Since the pop-up banner advertisement is directly controllable by the media playback unit, the reception advertising controller transmits the control signal for terminating the pop-up banner advertisement to the media playback unit.

The media playback unit plays back the media stream that includes OTT and advertising content, and controls the pop-up banner advertisement or playback of the media stream according to the control signal received from the reception advertising controller.

In the case of receiving, from the reception advertising controller, the control signal for controlling the pop-up banner advertisement to execute the quit button of the pop-up banner advertisement, the media playback unit may terminate the pop-up banner advertisement according to the received control signal. Subsequently, the media playback unit may terminate the pop-up banner advertisement and may resume an OTT service being viewed.

The apparatuses described herein may be implemented using hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable array (FPA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied in any type of machine, component, physical equipment, virtual equipment, computer storage medium or device, to be interpreted by the processing device or to provide an instruction or data to the processing device. The software also may be distributed over network coupled computer systems so that the software is stored and executed in a distributed fashion. The software and data may be stored by one or more computer readable storage media.

The methods according to the above-described example embodiments may be configured in a form of program instructions performed through various computer devices and recorded in non-transitory computer-readable media. The media may also include, alone or in combination with the program instructions, data files, data structures, and the like. The program instructions recorded in the media may be specially designed and configured for the example embodiments or may be known to those skilled in the computer software art and thereby available. Examples of the media include magnetic media such as hard disks, floppy disks, and magnetic tapes; optical media such as CD-ROM and DVDs; magneto-optical media such as floptical disks; and hardware devices that are specially configured to store program instructions, such as read-only memory (ROM), random access memory (RAM), flash memory, and the like. Examples of program instructions include both machine code, such as produced by a compiler, and files containing higher level code that may be executed by the computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for providing skipping of advertising content, the apparatus comprising:
    a controller configured to, when advertising content is played back during media stream playback of an advertising-based Over-the-Top (OTT) receiving platform, control video recognition for providing skipping of advertising content;
    a video recognition model executor configured to pre-store a target image of a quit button type or a skip-ad button type and to synchronize the target image for skipping of advertising content that is recognized during playback of the advertising content with a video frame analyzer in response to an instruction of the controller;
    the video frame analyzer configured to synchronize with the video recognition model executor and to extract and identify the target image as the quit button type or the skip-ad button type based on the pre-stored target image for skipping of advertising content from the advertising content being played back, and to transmit information about the extracted and identified target image to a reception advertising controller;
    the reception advertising controller configured to generate a plurality of control signals according to the type of the target image extracted and identified by the video frame analyzer and to transmit the plurality of control signals to a media playback unit or a media reception processing unit;
    the media playback unit configured to play back a media stream including OTT and advertising content and to control a pop-up banner advertisement or media stream playback according to a control signal received from the reception advertising controller; and
    the media reception processing unit configured to receive data for media stream playback from an external server that provides the media stream including the OTT and the advertising content and to control reception of the data according to a control signal received from the reception advertising controller.

2. The apparatus of claim 1, wherein the advertising content includes a video advertisement and a pop-up banner advertisement,
    the target image for skipping of advertising content includes a skip button for terminating playback of the video advertisement and a quit button for terminating the pop-up banner advertisement, and
    the video recognition model executor is configured to
    pre-store a corresponding target image for skipping of advertising content according to a type of the advertising content and
    synchronize the corresponding target image with the video frame analyzer by executing a video recognition model code in which the target image is pre-stored and learned.

3. The apparatus of claim 2, wherein the reception advertising controller is configured to
    when the target image extracted and identified by the video frame analyzer is the skip button for terminating playback of the video advertisement, generate a control signal for controlling reception of a video advertisement being received from the external server to execute the skip button and transmit the generated control signal to the media reception processing unit, and
    when the target image extracted and identified by the video frame analyzer is the quit button for terminating the pop-up banner advertisement, generate a control signal for controlling the pop-up banner advertisement to execute the quit button and transmit the generated control signal to the media playback unit.

4. The apparatus of claim 1, wherein the controller is configured to inquire a user through a user interface to enable setting or release of performing video recognition for providing skipping of advertising content during the media stream playback of the advertising-based OTT receiving platform and set or release the performing of the video recognition according to a result of inquiring.

5. A method of providing skipping of advertising content, the method comprising:
    when advertising content is played back during media stream playback of an advertising-based Over-the-Top (OTT) receiving platform, controlling video recognition for providing skipping of advertising content through a controller;
    executing, by a video recognition model executor, a video recognition model code in which a target image for skipping of advertising content is pre-stored and learned and synchronizing the target image for skipping of advertising content that is recognized during playback of the advertising content with a video frame analyzer in response to an instruction of the controller, wherein the pre-stored target image is of a quit button type or a skip-ad button type;
    extracting, by the video frame analyzer, and identifying the target image as the quit button type or the skip-ad button type based on the pre-stored target image for skipping of advertising content from the advertising content being played back through synchronization with the video recognition model executor, and transmitting information about the extracted and identified target image to a reception advertising controller;

generating, by the reception advertising controller, a plurality of control signals according to the type of the target image extracted and identified by the video frame analyzer and transmitting the plurality of control signals to a media playback unit or a media reception processing unit;

playing back, by the media playback unit, a media stream including OTT and advertising content and controlling a pop-up banner advertisement or media stream playback according to a control signal received from the reception advertising controller; and receiving, by the media reception processing unit, data for media stream playback from an external server that provides the media stream including the OTT and the advertising content and controlling reception of the data according to a control signal received from the reception advertising controller.

6. The method of claim 5, wherein the advertising content includes a video advertisement and a pop-up banner advertisement, the target image for skipping of advertising content includes a skip button for terminating playback of the video advertisement and a quit button for terminating the pop-up banner advertisement, a corresponding target image for skipping of advertising content according to a type of the advertising content is pre-stored in the video recognition model executor.

7. The method of claim 6, wherein the extracting, by the video frame analyzer, and identifying of the target image for the advertising content skipping from the advertising content being played back through synchronization with the video recognition model executor, and transmitting information about the extracted and identified target image to the reception advertising controller comprises:

extracting and identifying information about the skip button for terminating playback of the video advertisement when the advertising content being played back is the video advertisement; and extracting and identifying information about the quit button for terminating the pop-up banner advertisement when the advertising content being played back is the pop-up banner advertisement.

8. The method of claim 6, wherein the generating, by the reception advertising controller, the plurality of control signals according to the type of the target image extracted and identified by the video frame analyzer and transmitting the plurality of control signals to the media playback unit or the media reception processing unit comprises:

when the target image extracted and identified by the video frame analyzer is the skip button for terminating playback of the video advertisement, generating a control signal for controlling reception of a video advertisement being received from the external server to execute the skip button and transmitting the generated control signal to the media reception processing unit; and when the target image extracted and identified by the video frame analyzer is the quit button for terminating the pop-up banner advertisement, generating a control signal for controlling the pop-up banner advertisement to execute the quit button and transmitting the generated control signal to the media playback unit.

\* \* \* \* \*